United States Patent [19]

Albrecht et al.

[11] Patent Number: 5,627,261

[45] Date of Patent: May 6, 1997

[54] ALDEHYDE RESINS WITH REDUCED AND STABILIZED FREE-FORMALDEHYDE CONTENT

[75] Inventors: Norman G. Albrecht, Salisbury, N.C.; Michael T. Foran, Somerville, N.J.

[73] Assignee: National Starch and Chemical Investment Holding Corporation, Wilmington, Del.

[21] Appl. No.: 213,288

[22] Filed: Mar. 15, 1994

[51] Int. Cl.$^6$ .................................................. C08F 6/10
[52] U.S. Cl. .................. 528/492; 524/843; 525/374; 525/521; 528/227
[58] Field of Search .................... 528/492, 227; 524/843; 525/521, 374

[56] References Cited

U.S. PATENT DOCUMENTS

| | | | |
|---|---|---|---|
| 2,529,851 | 11/1950 | Scrutchfield | 524/47 |
| 3,019,120 | 1/1962 | Bauer et al. | 106/213 |
| 3,294,716 | 12/1966 | Pinney | 524/701 |
| 3,355,307 | 11/1967 | Schoenberger et al. | 106/213 |
| 3,487,033 | 12/1969 | McElmury et al. | 524/47 |
| 4,366,275 | 12/1982 | Silano et al. | 524/47 |
| 4,855,354 | 8/1989 | Mohler et al. | 525/54.24 |
| 5,079,067 | 1/1992 | Willging | 428/182 |
| 5,247,066 | 9/1993 | Schoenberg et al. | 528/491 |

*Primary Examiner*—Paul R. Michl
*Assistant Examiner*—John J. Guarriello
*Attorney, Agent, or Firm*—Eugene Zagarella, Jr.

[57] ABSTRACT

A ketone/formaldehyde crosslinking additive having reduced and stabilized free-formaldehyde content and which are useful in starch based alkaline corrugating adhesive compositions are provided by a process wherein the ketone/aldehyde additives are treated with hydrogen peroxide and further with an urea compound.

15 Claims, No Drawings

ALDEHYDE RESINS WITH REDUCED AND STABILIZED FREE-FORMALDEHYDE CONTENT

BACKGROUND OF THE INVENTION

This invention relates to ketone/aldehyde crosslinking resins having reduced and stabilized free-formaldehyde content and which are useful as water resistance additives in starch-based alkaline corrugating adhesive compositions used in the production of corrugated paperboard. More particularly, this invention is directed to ketone/aldehyde resins that are treated with hydrogen peroxide to significantly reduce free-formaldehyde content and which are further treated with a urea compound to stabilize and further reduce the free-formaldehyde content.

The procedures employed in the production of corrugated paperboard usually involve a continuous process whereby a strip of paperboard is first corrugated by means of heated, fluted rolls. The protruding tips on one side of this fluted paperboard strip are then coated with an adhesive, and a flat sheet of paperboard, commonly known in the trade as a facing, is thereafter applied to these tips. By applying heat and pressure to the two paperboard strips thus brought together, an adhesive bond is formed therebetween. The above-described procedure produces what is known as a single-faced board in that the facing is applied to only one surface thereof. If a double-faced paperboard in which an inner fluted layer is sandwiched between two facings is desired, a second operation is performed wherein the adhesive is applied to the exposed tips of a single-faced board and the adhesive-coated tips are then pressed against a second facing in the combining section of the corrugator under the influence of pressure and heat. The typical corrugating process and the use and operation of corrugators in general are described in U.S. Pat. Nos. 2,051,025 and 2,102,937 to Bauer.

Starch-based adhesives are most commonly used in the corrugating process due to their desirable adhesive properties, low cost and ease of preparation.

The most fundamental of starch corrugating adhesives is an alkaline adhesive which is comprised of raw, ungelatinized starch suspended in an aqueous dispersion of cooked starch. The adhesive is produced by gelatinizing starch in water with sodium hydroxide (caustic soda) to yield a primary mix of gelatinized or cooked carrier, which is then slowly added to a secondary mix of raw (ungelatinized) starch, borax and water to produce the full-formulation adhesive. In the corrugating process, the adhesive is applied (usually at between 25° and 55° C.) to the tips of the fluted paper medium or single-faced board, whereupon the application of heat causes the raw starch to gelatinize, resulting in an instantaneous increase in viscosity and formation of the adhesive bond. Such adhesives are described in the above-noted patents to Bauer. Typical "no carrier" starch adhesives are described in U.S. Pat. No. 3,487,033 to McElmury, et al., and U.S. Pat. No. 3,355,307 to Schoenberger, et al.

It is often desired or necessary in the manufacture of corrugated paperboard that the adhesive yield water-resistant bonds which can withstand extended exposure to high humidity, liquid water, melting ice and the like. A number of approaches have been devised to produce water-resistant corrugating adhesives. One method involves the preparation of an acidic, starch-based adhesive wherein urea-formaldehyde resin is added to the composition, together with an acidic catalyst such as aluminum sulfate, to produce water-resistant bonds in the corrugated board manufactured therewith. The adhesive composition itself, however, is deficient in other important properties such as corrugator bonding speeds, viscosity stability, and pot life and exhibits excessive formaldehyde odor. In addition, acidic corrugating adhesives tend to be corrosive.

The many disadvantages associated with the acidic corrugating adhesives led to the development of water-resistant alkaline curing starch-based adhesives for use in the corrugating industry. In the preparation thereof, a thermosetting resin, such as, e.g., urea-formaldehyde, resorcinol-formaldehyde, melamine-formaldehyde, phenol-formaldehyde, diacetone acrylamide-formaldehyde, ketonealdehyde and urea-acetone-formaldehyde condensate, is added to the adhesive as a crosslinking additive for the amylaceous components to produce water-resistant bonds. Preferred among these resins for superior water-resistant properties are ketone-formaldehyde condensates as disclosed in U.S. Pat. No. 2,529,851, and particularly acetone-formaldehyde resins. Some adhesives made from such resins, however, suffer from poor pot life and viscosity instability, as well as considerable formaldehyde odor.

In recent years, due to the toxicity of and increasing governmental regulations concerning formaldehyde, serious efforts have been made to reduce the levels of exposure to formaldehyde in the industrial workplace. Acetoneformaldehyde resins such as are employed as crosslinking additives in corrugating adhesives contain about 1.0 to 4.0% free (unreacted) formaldehyde by weight of condensate. Prior attempts to reduce formaldehyde levels in crosslinking additives as taught in U.S. Pat. Nos. 3,019,120 and 3,294,716 have not reduced free-formaldehyde amounts to a significant extent and/or have resulted in diminution of the degree of water resistance achieved in the bonds formed.

In U.S. Pat. No. 4,366,275 to Silano, et al., the crosslinking additive used with the starch-based alkaline corrugating composition comprises a mixture of acetone-formaldehyde condensate and dimethylol dihydroxy ethylene urea (DMDHEU) wherein at least a portion of the DMDHEU present is produced "in situ" by reaction of the free-formaldehyde contained in the acetone-formaldehyde condensate with dihydroxy ethylene urea. The patent discloses that the unreacted formaldehyde in the acetone-formaldehyde resin condensate is reduced to about 0.1 to 2% by weight. Experience has shown, however, that in most instances the free-formaldehyde is reduced only to a level of about 0.5 to 0.9% by weight of the condensate. Current industry requirements call for still lower levels of unreacted formaldehyde.

A recent patent, U.S. Pat. No. 5,079,067 to Willging, discloses the reduction of free-formaldehyde in formaldehyde containing resins to a level of less than 0.3%, by weight (of aqueous resin composition), by reacting the free-formaldehyde with a nitrogen base and urea in the presence of an acid catalyst.

Another recent patent, U.S. 5,247,066 to J. Schoenberg, et al., discloses another method for reducing levels of free-formaldehyde in ketone-formaldehyde crosslinking additives by treating the unreacted formaldehyde with hydrogen peroxide. While this method has resulted in significant reduction in free-formaldehyde content to levels of less than about 0.4% by weight of condensate (i.e., aqueous condensate or solution), some increase or degree of instability can occur over time under certain conditions, particularly elevated temperatures above atmospheric or ambient conditions.

Accordingly, it is an object of the present invention to provide a ketone-formaldehyde crosslinking additive, particularly one treated with hydrogen peroxide, which has very low levels of free-formaldehyde (less than 0.4% and preferably less than 0.2% by weight of condensate) as well as increased free-formaldehyde stability over time.

It is another object of this invention to provide a water-resistant, starch-based alkaline adhesive composition containing such crosslinking additive in the manufacture of corrugated paperboard.

SUMMARY OF THE INVENTION

The above and related objects are achieved in the use of a crosslinking additive comprised of a ketone-formaldehyde condensate which has been treated with from about 1.0 to 2.0 moles of hydrogen peroxide to significantly reduce free-formaldehyde content to a level of less than about 0.4% by weight of condensate (i.e., aqueous condensate or solution), and further is treated with an effective amount of urea to further reduce or maintain the free-formaldehyde content while providing increased stability over time.

In the process herein described for preparing the low formaldehyde crosslinking additive, a ketone such as acetone and formaldehyde are reacted in a molar ratio of 1 mole of ketone to about 2 to 5 moles of formaldehyde under aqueous alkaline conditions at about 20° to 80° C. to obtain a water-soluble ketone-formaldehyde condensate containing about 1 to 4% by weight unreacted formaldehyde and wherein at least an effective amount of hydrogen peroxide is added to said condensate to react with the unreacted formaldehyde present therein and allowing the reaction to proceed at about 60° to 100° C. at a pH of about 3.0 to 6.5 until the unreacted formaldehyde is reduced to less than about 0.4% and preferably less than about 0.2% by weight of the condensate, the improvement comprising adding an effective amount of urea or dihydroxyethylene urea (hereinafter referred to as DHEU) to provide a stable free-formaldehyde content over time.

The alkaline curing, starch based corrugating adhesive of this invention comprises:

A. from about 10 to 40% by weight, based on the total weight of the adhesive, of starch, this including the ungelatinized as well as the gelatinized portions of the starch (or in the case of "no-carrier" adhesives, the total starch content);

B. from about 0.3 to 5% by weight, based on the total weight of the starch, of an alkali;

C. from about 54 to 89% by weight, based on total weight of the adhesive, of water; and D. from about 0.3 to 12% by weight dry basis, based on total weight of the starch, of low formaldehyde crosslinking additive as described hereinafter.

While urea is known to react with formaldehyde, it is ineffective in reducing free-formaldehyde to the low levels attained with hydrogen peroxide. However, the combination of hydrogen peroxide and urea results in low free-formaldehyde content and significantly provides increased free-formaldehyde stability over time.

DETAILED DESCRIPTION OF THE INVENTION

The crosslinking additive of this invention is initially formed by reacting a ketone and formaldehyde under aqueous alkaline conditions at about 20° to 80° C., preferably 40° to 60° C. to produce a water-soluble ketone-formaldehyde condensate containing about 1 to 4% by weight of unreacted (free) formaldehyde. The proportion of reactants will ordinarily range from about 2 to 5 moles of formaldehyde to about 1 mole of ketone and preferably from 2.5 to 4.5 moles of formaldehyde to 1 mole of ketone. In preparing the condensate, the reaction may be conducted under a nitrogen atmosphere if desired. It will be recognized that the alkalinity and reaction temperature employed must be no greater than is necessary to produce a water-soluble condensate which has not cured into an infusible product. Typically, the pH of the reaction mixture is maintained at about 8 to 12, preferably 9 to 11, by incremental addition of a solution of an alkaline agent such as sodium hydroxide. The reaction is monitored for formaldehyde content and when it is below about 3%, the product is cooled to about 25° to 45° C. and neutralized with acid such as acetic acid, glacial acetic acid, and formic acid to a pH level of 4.8 to 6.2. The reaction time depends mainly on the temperature, alkalinity and desired solids content of the reaction mixture but is ordinarily such as to obtain a water-soluble acetone-formaldehyde condensate containing about 1 to 4% by weight of free-formaldehyde. The condensate will typically have a solids content of 40 to 65% by weight. Hydrogen peroxide (typically 30 to 50% aqueous) is added to the condensate in a stoichiometric amount with respect to the formaldehyde concentration with up to 150% excess. While higher concentrations of hydrogen peroxide may be used, the use of hydrogen peroxide in amounts over 2.5 moles per each mole of free-formaldehyde is not cost justified. The condensate/hydrogen peroxide mixture is then heated to about 60° to 100° C. and maintained within that range from 4 to 10 hours. The formaldehyde content is again monitored. The reaction is ordinarily terminated when the formaldehyde level is 0.4% or less by cooling the mixture and adjustment of the pH level to 5.0 to 6.5, if needed.

In making the crosslinking additive, the ketone may be any of the known monomers of the type including acetone, methylethyl ketone, acetophenone, benzophenone, cyclohexanone, etc. Acetone and its dimers, i.e., diacetone alcohol or mesityl oxide are especially useful with acetone being particularly preferred because of its cost, availability and reactivity. Sources of formaldehyde that can be used include gaseous formaldehyde, aqueous solutions of formaldehyde, trioxymethylene, hexamethylene tetraamine and paraformaldehyde.

Reduction in free-formaldehyde for the ketone-formaldehyde condensate is provided by adding hydrogen peroxide in an effective amount (up to 150% excess over the stoichiometric amount) to the condensate to oxidize the free-formaldehyde. More particularly, the condensate is treated with from about 1.0 to 2.5 moles of hydrogen peroxide, preferably 1.5 to 2.0 moles of hydrogen peroxide. The reaction of the hydrogen peroxide with formaldehyde will ordinarily lower the pH of the mixture to a level of about pH 3.0 to 6.5 due to the formation of formic acid. The reaction with free-formaldehyde and hydrogen peroxide is allowed to proceed at 60° to 100° C. until the free-formaldehyde level in the reaction mixture is reduced to less than 0.4% by weight of the mixture.

In a variation of this step, the condensate is maintained at an alkaline pH of 7 to 10 during the reaction with hydrogen peroxide. This can be effected by the addition of a base such as sodium hydroxide. Under these pH conditions, the temperature should be maintained at about 30° to 40° C. Higher temperatures and/or higher pH levels are undesirable because they accelerate the decomposition of the hydrogen peroxide.

Some residual hydrogen peroxide may remain (ordinarily less than 0.5% by weight of the mixture), when the oxidation reaction is terminated. The reaction is then ordinarily adjusted to a pH level of about 5.0 to 6.5 with sodium hydroxide or other suitable base or acid. While the final product pH of from about 4.0 to 8.0 is suitable for maintaining formaldehyde stability, it is preferred to have a final product pH of from about 5.0 to 6.5 because at neutral or alkaline pH levels there is a tendency of the resin to yield formaldehyde. The crosslinking additive thus produced is suitable for direct use in the starch-based alkaline corrugating adhesive compositions of this invention.

While it is not required, the oxidation of free formaldehyde in the condensate may be catalyzed with, for example, ferric sulfate, ferrous sulfate, ferric acetate, cupric or cuprous sulfate, or other known catalysts for such reactions. Use of ferric sulfate is preferred because of its low toxicity and because it significantly reduces the reaction period needed to arrive at a desired level of free-formaldehyde. Ordinarily the catalyst is added in amounts of 10 to 100 ppm of the reaction mixture.

The improvement represented by this invention involves treatment of the ketone-formaldehyde condensate with an urea compound to further reduce or maintain the free-formaldehyde content while providing increased stability over time, i.e., over periods of three months or more. The urea compound that can be used includes urea and dihydroxyethylene urea. The amount used will be an effective amount to provide a stable free-formaldehyde content over time and generally this will vary between about 0.25 and 10% and preferably from about 2.5 to 7.5% by weight of urea based on the weight of the condensate. This amount may vary depending on conditions such as pH and temperature.

The corrugating adhesive composition of this invention is comprised of starch, water, alkali, the selected low formaldehyde crosslinking additive as described herein, and optionally borax. The starch component, which may be the ungelatinized starch and/or gelatinized carrier starch portion of the adhesive composition herein may be selected from any of the several starches, native or converted, heretofore employed in starch corrugating adhesive compositions. Suitable starches include, for example, those starches derived from corn, potato, waxy maize, tapioca, sorghum, wheat, as well as high-amylose starches, i.e., starches which contain 30% or more by weight of amylose, and the various derivatives of these starches. Hence, among the applicable starches are included the various starch derivatives such as ethers, esters, thin-boiling types prepared by known processes such as mild acid treatments, oxidation, etc. and those derivatives of these starches which have high amylose contents. Preferred starches are those typically employed in corrugating adhesives of the alkaline type.

The starch content of the adhesive can vary considerably depending on several factors such as the intended end-use application of the adhesive and the type of starch used. The total amount of starch employed, including gelatinized and ungelatinized portions of starch, ordinarily will be in the range of about 10 to 40% by total weight of the adhesive and preferably 18 to 35%.

The remainder of the adhesive composition is composed of about 0.3 to 5% of an alkali such as sodium hydroxide, based on total weight of starch, about 0.3 to 12% on dry basis, preferably 1 to 5%, of the low formaldehyde crosslinking additive as described below, based on total weight of starch, and about 54–89% of water, based on total weight of the adhesive.

If desired, small amounts of borax or other boron containing salts, up to about 5% based on the total weight of starch, may be added to the adhesive to improve the tackifying properties thereof.

The alkali (base) employed herein is preferably sodium hydroxide; however, other bases may be employed in partial or full replacement of the sodium hydroxide and include, for example, alkali metal hydroxides such as potassium hydroxide, alkaline earth hydroxides such as calcium hydroxide, alkaline earth oxides such as barium oxide, alkali metal carbonates such as sodium carbonate, and alkali metal silicates such as sodium silicate. The alkali may be employed in aqueous or solid form.

In addition to the essential ingredients of the adhesive composition herein, any conventional non-chemically functional additives may be incorporated into the adhesive in minor amounts, if desired. Such additives include, for example, wetting agents, proteins, plasticizers, solubilizing agents, rheology modifiers, tackifiers such as borax, water conditioners, penetration control agents, peptizers such as urea, gelatinization temperature modifiers, inert fillers such as clay and finely ground polymers, thickeners such as inorganic colloidal clays, guar, hydroxyethyl cellulose, alginates, polyvinyl alcohol, polymers of ethylene oxide and the like, and emulsions such as polyvinyl acetate.

Further description regarding the acetone-formaldehyde crosslinking additive and the corrugating adhesive composition may be found in U.S. Pat. No. 5,247,066 issued to J. Schoenberg, et al. on Sep. 21, 1993 and which is incorporated by reference herein.

In the preparation of the adhesive composition herein, a portion of the total starch required in the adhesive is gelatinized in water with caustic soda to form the carrier, which is then slowly added to a mixture of raw starch, borax and water. The crosslinking additives may be added to the raw starch mixture or to the final adhesive mixture as desired. While this description of the corrugating adhesive composition is directed to a composition comprising a carrier starch and a raw starch, it may also include a no carrier composition having just a single starch component comprising an ungelatinized starch which upon subsequent treatment with alkali becomes partially swollen.

The adhesive thus obtained can be used to bond single- or double-faced boards using any equipment which is presently employed for the preparation of corrugated board. The adhesive is maintained at a temperature preferably between 25° and 55° C. before its application to the protruding tips of the fluted paper strip. The actual application may be accomplished by the use of glue rolls which are ordinarily employed in most corrugating machines, or one may, if desired, utilize other application methods which may be able to achieve a different distribution of adhesive. Following the application of the adhesive to the fluted paper strip, the latter is then brought into immediate contact with the facing board under the influence of heat and pressure, as is well known in the art. A double-faced board may be subsequently prepared by bringing a second facing in contact with the open fluted surface of the single-faced board by the usual procedures.

The examples which follow illustrate specific embodiments of the invention. In the examples all parts and percentages are given by weight and all temperatures in degrees Celsius unless otherwise noted.

In determining the amount of free-formaldehyde contained in the acetone-formaldehyde condensates herein, a titration method was employed whereby a 12 g sample of the condensate is weighed into a 250 ml flask to which is added crushed ice. This is then titrated with 0.10N sodium hydroxide until a pH of 10–10.5 is attained. A sodium sulfite solution of 127 g/l is added in an amount of 50 ml and the resulting solution is titrated with 0.10N hydrochloric acid until the pH noted above is attained. The formula to determine free formaldehyde content of the sample is:

$$\% \text{ Free Formaldehyde} = \frac{(\text{ml } 0.10 \text{ N HCl}) \times 0.30}{\text{weight of sample (g)}}$$

EXAMPLE I

This example illustrates a representative preparation of an acetone-formaldehyde condensate and the oxidation of formaldehyde in the condensate with hydrogen peroxide.

In a reaction vessel equipped with a thermometer and means of heating and stirring, 58 g (1 mole) of acetone is combined with 252.3 g (4.2 moles) of 50% aqueous formaldehyde and the solution is heated to 50° to 55° C. About 0.7 g of 6.25N sodium hydroxide is added and the mixture is held at 55° to 60° C. during the exothermic reaction. An additional 21.8 g of 6.25N sodium hydroxide is added over 2.5 to 3 hours while maintaining the reaction temperature between 57° and 58° C. The reaction is continued for an additional 0.25 hours and the mixture then analyzed for formaldehyde content. When the formaldehyde concentration is below 2.5%, heating is discontinued and the condensate product is cooled to 40° C. The pH is adjusted to 5 to 6 with glacial acetic acid.

A mixture of 491.4 g of the acetone-formaldehyde condensate, prepared as described above (formaldehyde concentration 1.1% by weight of mixture, 0.18 moles), 40.8 g of 30% aqueous hydrogen peroxide (0.36 mole) and 0.019 g of $Fe_2(SO_4)_3$ hexahydrate was added to a glass, round-bottom flask fitted with a thermometer, condenser and Teflon stirrer. The mixture was heated at 85° C. for 4 hours and had a formaldehyde concentration in the condensate of 0.13% by weight of the mixture after 2.75 hours and 0.05% by weight after 4 hours. The solution was then cooled and neutralized to a pH of 6.0 using 15.0 ml of 6.25N sodium hydroxide. The hydrogen peroxide concentration was 0.06% by weight of the mixture.

EXAMPLE II

The acetone-formaldehyde resin of Example I was treated with urea and DHEU (dihydroxyethylene urea) under different conditions and evaluated for free-formaldehyde content over time using an aging study at 43° C. The results are shown in the following table:

TABLE

| | | | | Aging Study at 43° C. | | | | | |
|---|---|---|---|---|---|---|---|---|---|
| | | | | | % FREE-FORMALDEHYDE | | | | |
| RUN | Product pH | % UREA | % DHEU | INITIAL | 1ST WEEK | 2ND WEEK | 3RD WEEK | 4TH WEEK | 8TH WEEK |
| 1 | 6.0 | 0.0 | 0.0 | 0.14 | 0.26 | 0.27 | 0.29 | 0.28 | 0.3 |
| 2 | 6.0 | 5.0 | 0.0 | 0.12 | 0.13 | 0.09 | 0.08 | 0.07 | 0.06 |
| 3 | 8.0 | 0.0 | 0.0 | 0.15 | 0.31 | 0.37 | 0.40 | 0.41 | 0.42 |
| 4 | 8.0 | 5.0 | 0.0 | 0.12 | 0.12 | 0.11 | 0.11 | 0.10 | 0.12 |
| 5 | 7.0 | 2.5 | 0.0 | 0.13 | 0.15 | 0.15 | 0.14 | 0.13 | 0.18 |
| 6 | 4.5 | 0 | 0 | 0.09 | 0.15 | 0.18 | 0.19 | 0.19 | — |
| 7 | 4.5 | 1.0 | 0 | 0.08 | 0.11 | 0.14 | 0.15 | 0.15 | — |
| 8 | 4.5 | 0 | 1.0 | 0.12 | 0.15 | 0.17 | 0.17 | 0.18 | — |
| 9 | 6.5 | 0 | 0 | 0.11 | 0.23 | 0.29 | 0.32 | 0.33 | — |
| 10 | 6.5 | 1.0 | 0 | 0.10 | 0.16 | 0.18 | 0.19 | 0.20 | — |
| 11 | 6.5 | 0 | 1.0 | 0.14 | 0.21 | 0.23 | 0.24 | 0.25 | — |
| 12 | 4.0 | 0 | 0 | 0.11 | 0.16 | 0.21 | 0.23 | 0.22 | 0.21 |
| 13 | 4.0 | 5.0 | 0 | 0.07 | 0.10 | 0.11 | 0.11 | 0.11 | 0.10 |

These results show a significant improvement in free-formaldehyde content over time when the condensate was treated with urea or DHEU. This was evidenced by a reduction or maintenance of the free-formaldehyde level over time or a smaller increase (more stable) for the urea treated condensate compared to the sample condensates which were not treated.

To further show the advantage of using this invention, comparative examples (Runs 14 and 15) are shown below wherein the use of an acetone-formaldehyde resin similar to that shown above but without oxidation with hydrogen peroxide, one treated with urea (Run 15) and one without urea (Run 14) were evaluated as above:

| | | | % FREE-FORMALDEHYDE | | | | | |
|---|---|---|---|---|---|---|---|---|
| RUN | Product pH | % UREA | INITIAL | 1ST WEEK | 2ND WEEK | 3RD WEEK | 4TH WEEK | 8TH WEEK |
| 14 | 7.1 | 0 | 1.96 | 1.95 | 1.90 | 1.91 | 1.88 | 1.77 |
| 15 | 7.2 | 5 | 1.73 | 0.66 | 0.68 | 0.69 | 0.68 | 0.61 |

These results show that only when both the combination of hydrogen peroxide and urea treatment are used are the results of a stable and low free-formaldehyde content attained.

What is claimed is:

1. In a process for preparing a low formaldehyde crosslinking additive wherein a ketone and formaldehyde are reacted in a molar ratio of 1 mole of ketone to about 2 to 5 moles of formaldehyde under aqueous alkaline conditions at about 20 to 80° C. to obtain a water-soluble ketone-formaldehyde condensate containing about 1 to 4% by weight of unreacted formaldehyde and wherein at least an effective amount of hydrogen peroxide is added to said condensate to react with the unreacted formaldehyde present therein and allowing the reaction to proceed at about 60 to 100° C. at a pH of about 3.0 to 6.5 until the unreacted formaldehyde is reduced to less than about 0.4% by weight of the condensate, the improvement comprising further treating the condensate by adding an effective amount of urea or dihydroxyethylene urea to provide a stable free formaldehyde content.

2. The process of claim 1 wherein the ketone is acetone.

3. The process of claim 2 wherein from about 0.25 to 10% by weight of the urea based on the weight of the condensate is used.

4. The process of claim 3 wherein the final formaldehyde condensate product has a pH of about 5.0 to 6.5.

5. The process of claim 2 wherein about 1.0 to 2.5 moles of hydrogen peroxide are used for 1.0 mole of unreacted formaldehyde and the reaction is carried out in the presence of a catalyst.

6. The process of claim 5 wherein the catalyst is ferric sulfate or ferrous sulfate.

7. The process of claim 2 wherein from about 2.5 to 7.5% by weight of the urea based on the weight of the condensate is used.

8. The process of claim 7 wherein the final formaldehyde condensate product has a pH of about 5.0 to 6.5.

9. The process of claim 8 wherein about 1.0 to 2.5 moles of hydrogen peroxide are used for 1.0 mole of unreacted formaldehyde and the reaction is carried out in the presence of a catalyst.

10. The process of claim 9 wherein the unreacted formaldehyde is reduced to less than about 0.2% by weight of the condensate.

11. The process of claim 10 wherein urea is used.

12. The process of claim 11 wherein the catalyst is ferric sulfate or ferrous sulfate.

13. The crosslinking additive prepared by the process of claim 1.

14. The crosslinking additive prepared by the process of claim 3.

15. The crosslinking additive prepared by the process of claim 10.

* * * * *